J. P. ALLEN.
Cotton-Seed Planter.

No. 101,206.

Patented March 29, 1870.

Witnesses:

Inventor:

United States Patent Office.

JOHN P. ALLEN, OF DAWSON, GEORGIA.

Letters Patent No. 101,206, dated March 29, 1870.

IMPROVEMENT IN COTTON-SEED PLANTERS.

The Schedule referred to in these Letters Patent and making part of the same.

*To all whom it may concern:*

Be it known that I, JOHN P. ALLEN, of Dawson, in the county of Terrell and State of Georgia, have invented a new and useful Improvement in Cotton-Seed Planters; and I do hereby declare that the following is a full, clear, and exact description thereof, which will enable others skilled in the art to make and use the same, reference being had to the accompanying drawings forming part of this specification, in which—

Similar letters of reference indicate corresponding parts.

My invention has for its object to improve the construction of my improved cotton-seed planter, patented October 4, 1859, and August 14, 1860, and numbered 25,616 and 29,555, respectively, so as to make it simpler and less expensive in construction, and at the same time more effective and reliable in operation; and It consists in the construction and combination of various parts of the machine, as hereinafter more fully described.

A is the beam, to the rear end of which is attached the standard B, to the lower end of which is attached the plow C, by which the furrow is opened to receive the seed.

The rear part of the beam A and the lower part of the standard B are mortised to receive the spout D, which receives the seed from the hopper and conducts it to the ground in the rear of the plow C.

The spout is made of sheet metal, and is bent to fit upon the mortised beam and standard, so as to be retained in place without other fastening.

Figure 1:
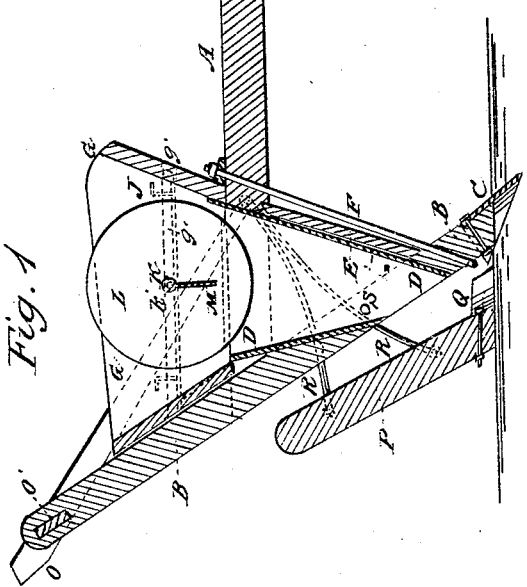
Figure 1 is a vertical longitudinal section of my improved machine, taken through the line x x of fig. 2.

The front edge of the spout D is protected by a bar or board E, the ends of which enter grooves or notches in the beam A and standard B, and is retained in place by the brace-rod F, which passes through the beam A, in front of the hopper and through the lower part of the standard B, as shown in fig. 1.

The brace F supports the draft strain upon the standard B, and strengthens the frame of the cultivator generally.

Figure 2:
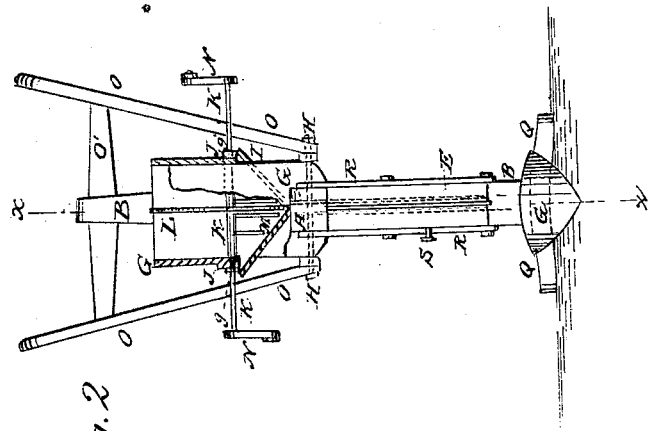
Figure 2 is a front view of the same, part being broken away to show the construction.

G is the hopper, the inclined end boards of which have their lower ends notched to fit upon the beam A, as shown in fig. 2.

The hopper G is secured in place by a long bolt, H, which passes through the beam A, and through the notched lower end of the front end board of the said hopper G.

I are the bottom boards of the hopper, the ends of which work in inclined grooves in the front and rear end boards of the hopper G. This enables the bottom boards I to be moved closer together or farther apart, to adjust the size of opening or space between them, according as less or more seed is required to be dropped.

The bottom boards I are secured in place when adjusted by the pins J, which pass down through holes in the outwardly-projecting flanges g, formed upon the lower edges of the side boards of the hopper G, and into or against the said bottom boards I.

Several holes should be formed in the flanges g for the pins J, so that the holes or pricks in the bottom boards I need not be too close together. The adjacent edges of the bottom boards I may be sharpened and plated with iron, if desired.

K is a shaft, which passes through and works in the flanged lower edges of the side boards of the hopper G.

To the center of the shaft K is attached a sheet-metal wheel, L, which should be made of such a size as to project upward above the seed that may be in the hopper G, and downward into the space or opening between the inner edges of the bottom boards I, as shown in figs. 1 and 2.

To the shaft K, upon each side of the wheel L, are attached two or more pins M, projecting downward nearly to the bottom boards I, as shown in figs. 1 and 2.

To the outer ends of the shaft K are attached crank-arms N, projecting in opposite directions, and which have eyes formed in or attached to their outer ends, to receive cords connected with the fore legs of the team, as described in one of my patents hereinbefore referred to.

The play of the wheel L, shaft K, and pins M, is limited by pins K', passed in through holes in the side boards of the hopper G, for the outer pins M of the shaft K to strike against, as shown in figs. 1 and 2.

By this construction and arrangement, as the planter is drawn forward the shaft K and wheel L will be oscillated, the pins M keeping the seed stirred up in the lower part of the hopper, and the wheel L keeping the seed from becoming clogged in the upper part of the hopper, and at the same time feeding said seed down through the opening between the bottom boards I.

O are the handles through the forward ends of which the long bolt H passes, and the rear parts of which are connected and held in their proper position by the round or cross-bar O', by which they are connected with the upper end of the standard B, as shown in figs. 1 and 2.

P is the coverer-standard, to the lower end of which is pivoted the coverer-plate Q, so that it may readily adjust itself to the surface of the ground, however the planter may be held.

To the upper and lower parts of the coverer-standard P are attached the rear ends of the bars R, through the forward ends of which the long bolt H passes, so as to pivot the coverer to the frame of the planter.

The play of the coverer may be limited by one or more stop-pins, S, attached to the standard B, and against which the bars R may strike.

Having thus described my invention,

I claim as new and desire to secure by Letters Patent—

1. The combination of the hopper G g', adjustable bottom boards I, wheel L, axle K, pins M, and crank-arms N with each other and with the beam A, spout D, and standard B, substantially as herein shown and described and for the purpose set forth.

2. The combination and arrangement of the coverer P Q R, with the standard B, beam A, hopper G I, and dropping device K L M N, substantially as herein shown and described, and for the purpose set forth.

3. The combination of the long bolt H with the beam A, notched lower end of the forward end board of the hopper G, handles O, and coverer P Q R, substantially as herein shown and described and for the purpose set forth.

JOHN P. ALLEN.

Witnesses:
JOHN REDDICK,
JACOB REED.